United States Patent [19]

Davis et al.

[11] Patent Number: 4,576,882

[45] Date of Patent: Mar. 18, 1986

[54] POLYETHYLENE IMINE-METAL SALT SOLID ELECTROLYTE

[75] Inventors: George T. Davis; Chawan-Kang Chiang, both of Gaithersburg; Joseph M. Antonucci, Kensington, all of Md.; Toru Takahashi, Chiba, Japan

[73] Assignee: The United States of America as represented by the Secretary of the Navy, Washington, D.C.

[21] Appl. No.: 706,811

[22] Filed: Feb. 28, 1985

[51] Int. Cl.$^4$ .............................................. H01M 6/18
[52] U.S. Cl. .................................. 429/192; 210/500.2; 252/62.2
[58] Field of Search ..................... 429/192; 210/500.2; 252/62.2

[56] References Cited

U.S. PATENT DOCUMENTS

| | | | |
|---|---|---|---|
| 3,647,086 | 3/1972 | Mizutani et al. | 210/500.2 |
| 4,303,748 | 12/1981 | Armand et al. | 429/192 |
| 4,471,037 | 9/1984 | Bannister | 429/192 |
| 4,505,997 | 3/1985 | Armand et al. | 429/192 |

*Primary Examiner*—Donald L. Walton
*Attorney, Agent, or Firm*—Robert F. Beers; Kenneth E. Walden; Roger D. Johnson

[57] ABSTRACT

A solid polymer electrolyte having
 (a) a matrix of linear poly(ethylene imine) having the formula $(-CH_2CH_2NH-)_n$; and
 (b) a metal salt which is LiI, LiClO$_4$, NaI, NaBr, KI, CsSCN, AgNO$_3$, CuCl$_2$, CoCl$_2$, or Mg(ClO$_4$)$_2$, wherein the salt is dissolved in and distributed throughout the poly(ethylene imine) matrix and from more than zero to 0.10 moles of salt are used per mole of monomer repeat unit, $-CH_2CH_2NH-$.

8 Claims, No Drawings

POLYETHYLENE IMINE-METAL SALT SOLID ELECTROLYTE

BACKGROUND OF THE INVENTION

This invention relates to battery electrolytes and more particularly to solid polymeric electrolytes.

Solid electrolytes have been shown to be a practical substitute for aqueous electrolytes in electrochemical cells or batteries wherein the electrolytes have been $Ag_3SI$, one of the family $MAg_4I_5(M=K, Rb, Cs)$, or one of the -aluminas, $M_2O \cdot 11Al_2O_3(M=Li, Na, K, NH_4, Tl, Ag,$ etc). Polymers offer the potential of being used as solid electrolytes because of their ability to be formed into thin films and the ability of some polymers to dissolve salts and transport ions. Polymeric electrolytes offer the advantage of being readily prepared in thin films of large area both of which reduce cell resistance and allow large current drains at low current densities. Polyethylene oxide, PEO, has been shown to dissolve and interact strongly with alkali metal salts. Thus, PEO can be used for polymeric electroytes. A few other polymers containing high concentrations of polar groups and highly flexible chains have been reported to dissolve salts. These include poly(propylene oxide),

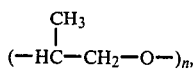

poly(epichlorohydrin),

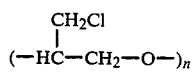

and more recently poly(ethylene succinate),

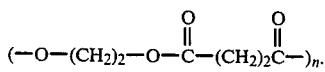

It would be desirable to have other polymeric electrolytes, particularly ones using salts other than alkali metal salts.

SUMMARY OF THE INVENTION

Accordingly, it is an object of invention to provide new solid electrolytes.

Another object of this invention is to provide new polymeric electrolytes.

A further object of this invention is to provide polymeric electrolytes using a wider variety of metal salts.

These and other objects of this invention are accomplished by providing;

A solid polymer electrolyte comprising:

(a) a matrix of linear poly(ethylene imine) having the formula $(-CH_2CH_2NH-)_n$; and (b) a metal salt which is LiI, LiClO$_4$, NaI, NaBr, KI, CsSCN, AgNO$_3$, CuCl$_2$, CoCl$_2$, or Mg(ClO$_4$)$_2$, wherein the salt is dissolved in and distributed throughout the poly(ethylene imine) matrix and from more than zero to 0.10 moles of salt are used per mole of monomer repeat unit, $(-CH_2CH_2NH-)$.

The poly(ethylene imine) used in the composites of this invention is linear and semicrystalline in nature as opposed to commercial poly(ethylene imine) which is highly branched. The linear, semicrystalline poly(ethylene imine) starting material can be prepared according to the methods disclosed by T. Saegusa, H. Ikeda, and H. Fujii, in "Crystalline Polyethylene Imine," Macromolecules 5 108 (1972) and in Polymer J. 1972, 3, 35, herein incorporated by reference. In one procedure, methyl iodide is used to initiate the ring-opening polymerization of 2-methyl oxazoline in dimethyl formamide to yield poly(N-acetyl-ethylene imine). The polymer is then hydrolyzed in 2.5 N NaOH at 100° C. to yield linear poly(ethylene imine):

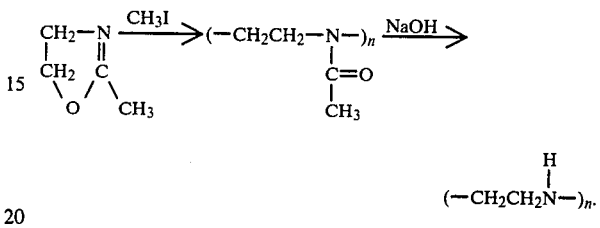

The resulting poly(ethylene imine) is carefully rinsed to remove impurities. The average molecular weight of the polymer produced according to the Saegusa et al. conditions is about 2000. By using less reagent and increasing the reaction time, polymers having average molecular weights of up to 4000 have been produced. High molecular weight poly(ethylene imine) polymers are less dependent on crystallization for structural strength. Therefore, poly(ethylene imine) polymers having average molecular weights greater than 4000 (e.g., 20,000) would be still more preferred.

The following metal salts dissolve in the linear poly(ethylene imine) and are suitable for the polymeric electrolytes of this invention: LiI, LiClO, NaI, NaBr, KI, CsSCN, AgNO$_3$, CuCl$_2$, CoCl$_2$, and Mg (ClO$_4$)$_2$. The addition of even a small amount of salt increases the conductivity of the poly(ethylene imine). From more than zero to about 0.10, and preferably from more than zero to 0.05 moles of metal salt are added per mole of monomer repeat $(-CH_2CH_2NH-)$. Conductivity peaks at 0.05 but is still satisfactory at 0.10 moles of metal salt per mole of monomer repeat unit.

With the addition of too much salt, the poly(ethylene imine) can become pasty and therefore unsuitable as a polymer electrolyte. However, at a salt concentration of 0.10 moles of metal salt per mole of monomer repeat unit, the polymer electrolyte still has a good structure. Thus, paste formation is not a problem in the salt concentration ranges described herein.

The selected metal salt and the poly(ethylene imine) are dissolved in a suitable solvent such as acetonitrile. The solvent is then removed under vacuum to yield the solid polymer electrolyte. A close examination of the polymer electrolyte reveals three phases which are distributed in very small zones throughout the electrolyte: (1) crystallized poly(ethylene imine), (2) co-crystallized metal salt and poly(ethylene imine), and (3) amorphous poly(ethylene imine). The amorphous form of the poly(ethylene imine) forms the major portion of the poly(ethylene imine) matrix.

Finally, the electrolyte material is preferably formed into thin films of large area which reduce cell resistance and allow large current drains at low current densities.

The general nature of the invention having set forth, the following example is presented as a specific example thereof. It will be understood that the invention is not limited to this specific example but is susceptable to various modifications that will be recognized by one of ordinary skill in the art.

EXAMPLE

Linear poly(ethylene imine) was synthesized following the procedure of Saegusa et al. in which methyl iodide was used to initiate the ring-opening polymerization of 2-methyl oxazoline in dimethyl formamide to yield poly(N-acetylethylene imine). The polymer was then hydrolyzed in 2.5 N NaOH at 100° C to yield linear poly(ethylene imine). The polymer was washed with cold water until the filtrate was neutral and then dried under vacuum while slowly heating to 100° C. Analysis for C, H & N indicates the polymer is about 97% pure and the molecular weight as determined by GPC in chloroform solution was 2,000.

Solid solutions of sodium iodide in the poly(ethylene imine) were prepared by dissolving both components in acetonitrile at 80° C, cooling the solution to room temperature and evaporating the solvent under vacuum [PEI is insoluble in $CH_3CN$ at 23° C. but is "salted-in" by the presence of dissolved NaI.]. Final removal of solvent was accomplished under vacuum at temperatures just below the melting point of the sample (60° C. for NaI contents up to 0.1 mole/mole of monomer repeat and 100° C. for high concentration of NaI.) Dried samples were stored in sealed containers within an argon-filled dry box.

Upon addition of 0.10 mole of NaI per mole of monomer repeat, the conductivity in the polymer at 60° C. increases from $6 \times 10^{-8} (ohm\ cm)^{-1}$ to $1.5 \times 10^{-6} (ohm\text{-}cm)^{-1}$.

Obviously, numerous modifications and variations of the present invention are possible in light of the above teachings. It is therefore to be understood that within the scope of the appended claims the invention may be practiced otherwise than as specifically described herein.

We claim:

1. A solid polymer electrolyte comprising:
   (a) a matrix of linear poly(ethylene imine) having the formula $(-CH_2CH_2NH-)_n$; and
   (b) a metal salt selected from the group consisting of LiI, LiClO$_4$, NaI, NaBr, KI, CsSCN, AgNO$_3$, CuCl$_2$, CoCl$_2$, and Mg(ClO$_4$)$_2$, wherein the salt is dissolved in and uniformly distributed throughout the poly(ethylene imine) matrix and from more than zero to 0.10 moles of salt are used per mole of monomer repeat unit, $-CH_2CH_2NH-$.

2. A solid polymer electrolyte according to claim 1 wherein the metal salt is selected from the group consisting of AgNO$_3$, CuCl$_2$, CoCl$_2$, and Mg(ClO$_4$)$_2$.

3. A solid polymer electrolyte according to claim 2 wherein from more than zero to 0.05 moles of metal salt are used per mole of monomer repeat unit.

4. A solid polymer electrolyte according to claim 1 wherein the metal salt is selected from the group of alkali metal salts consisting of LiI, LiClO$_4$, NaI, NaBr, KI, and CsSCN.

5. A solid polymer electrolyte according to claim 4 wherein from more than zero to 0.05 moles of metal salt are used per mole of monomer repeat unit.

6. A solid polymer electrolyte according to claim 4 wherein the metal salt is NaI.

7. A solid polymer electrolyte according to claim 6 wherein from more than zero to 0.05 moles of NaI is used per mole of monomer repeat unit.

8. A solid polymer electrolyte according to claim 1 wherein the average molecular weight of the poly(ethylene imine) polymer is from about 2000 to about 4000.

* * * * *

UNITED STATES PATENT OFFICE
CERTIFICATE OF CORRECTION

Patent No. 4,576,882          Dated March 18, 1986

Inventor(s) George T. Davis, Chawan-Kang Chiang, Joseph M. Antonucci and
Toru Takahashi It is certified that error appears in the above-identified patent and that said Letters Patent are hereby corrected as shown below:

Title page:

In the list of inventors, "Chawan-Kang" should read "Chwan-Kang".

Signed and Sealed this

Seventh Day of October, 1986

[SEAL]

Attest:

DONALD J. QUIGG

Attesting Officer          Commissioner of Patents and Trademarks